United States Patent
Anderson

(10) Patent No.: US 12,222,563 B2
(45) Date of Patent: Feb. 11, 2025

(54) MULTI-TIP WAVEGUIDE COUPLER WITH IMPROVED ALIGNMENT GUIDANCE

(71) Applicant: MACOM Technology Solutions Holdings, Inc., Lowell, MA (US)

(72) Inventor: Sean P. Anderson, Macungie, PA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 16/709,995

(22) Filed: Dec. 11, 2019

(65) Prior Publication Data
US 2021/0181436 A1     Jun. 17, 2021

(51) Int. Cl.
G02B 6/42     (2006.01)

(52) U.S. Cl.
CPC ............ *G02B 6/4206* (2013.01); *G02B 6/42* (2013.01); *G02B 6/4228* (2013.01)

(58) Field of Classification Search
CPC .......... G02B 6/34; G02B 6/262; G02B 6/305
See application file for complete search history.

(56) References Cited

U.S. PATENT DOCUMENTS

| | | | |
|---|---|---|---|
| 9,316,788 B2* | 4/2016 | Witzens | G02B 6/13 |
| 10,031,291 B1* | 7/2018 | Horth | G02B 6/29346 |
| 10,302,859 B1* | 5/2019 | Martin | G02B 6/24 |
| 10,324,261 B2* | 6/2019 | Leijtens | G02B 6/4274 |
| 10,677,991 B2* | 6/2020 | Novack | G02B 6/29332 |
| 2008/0138008 A1 | 6/2008 | Tolstikhin | |
| 2011/0235968 A1 | 9/2011 | Na | |
| 2012/0230635 A1* | 9/2012 | Yoshida | G02B 6/125 385/43 |
| 2017/0090118 A1* | 3/2017 | Sodagar | G02B 6/262 |
| 2017/0153392 A1* | 6/2017 | Murray | G02B 6/4212 |
| 2018/0224605 A1 | 8/2018 | Painchaud | |

(Continued)

FOREIGN PATENT DOCUMENTS

WO     2018/113627     6/2018

OTHER PUBLICATIONS

Y. Tu; et al (2019) "High-Efficiency Ultra-Broadband Multi-Tip Edge Couplers for Integration of Distributed Feedback Laser With Silicon-on-Insulator Waveguide," in IEEE Photonics Journal, vol. 11, No. 4, pp. 1-13.

(Continued)

*Primary Examiner* — Eric Wong
(74) *Attorney, Agent, or Firm* — Faegre Drinker Biddle & Reath LLP

(57) ABSTRACT

Disclosed are various embodiments for a multi-tip laser coupler with improved alignment guidance. A photonic integrated circuit (PIC) includes an input interface, an output interface, and a waveguide array. The waveguide array includes a first waveguide, a second waveguide, and a third waveguide. The first waveguide and the third waveguide are coupled to the input interface and are not coupled to the output interface. The second waveguide is coupled to the input interface and the output interface. Further, the second waveguide is positioned parallel to and between the first waveguide and a third waveguide. The second waveguide includes a tapered body such that an output end of the second waveguide coupled to the output interface is wider than an input end of the second waveguide coupled to the input interface.

28 Claims, 7 Drawing Sheets

(56) References Cited

U.S. PATENT DOCUMENTS

2019/0086620 A1* 3/2019 Chen .................... G02B 6/1228
2019/0384003 A1* 12/2019 Painchaud ........... G02B 6/2821

OTHER PUBLICATIONS

Wang,; et al (2018). "Fork Type Structure of Silicon Waveguide for Optical Efficiency Optimization." In 2018 IEEE 68th Electronic Components and Technology Conference (ECTC) 2095-2100.
J. Witzens, S.; et al (2014) "Hybrid Integration of Laser Diodes with Alignment Tolerant Couplers", Integrated Photonics, ECOC.
International Search Report and Written Opinion issued by the International Searching Authority, dated Mar. 19, 2021, for International Patent Application No. PCT/US20/64290; 16 pages.
International Search Report and Written Opinion issued by the International Search Authority, dated Mar. 19, 2021, for International Patent Application No. PCT/US2020/64290; 9 pages.
Tu, "High-Efficiency Ultra-Broadband Multi-Tip Edge Couplers for Integration of Distributed Feedback Laser with Silicon-on-Insulator Waveguide", 1-14, IEEE Photonics Journal, Aug. 2019, vol. 11, No. 4, pp. 1-14, https://ieeexplore.ieee.org/stamp/stamp.jsp?arnumber=8744264; 14 pages.
Extended European Search Report issued by the European Patent Office, dated Nov. 9, 2023, for European Patent Application No. 20898666.1; 8 pages.

* cited by examiner

MULTI-TIP WAVEGUIDE COUPLER WITH IMPROVED ALIGNMENT GUIDANCE

BACKGROUND

Semiconductor fabrication relates to the mass-manufacturing of semiconductor devices, including optical semiconductor devices and systems. However, a major difficulty in semiconductor technology deals with coupling light to and from optical chips. For instance, coupling an optical device, such as a laser, to a photonic integrated circuit (PIC) relies on incredibly precise mechanical alignment between the laser and waveguides formed in the photonic integrated circuit. Currently, vertical alignment tends to be more precise due to existing process controls. Horizontal alignment has proven to be much more difficult. Imperfect horizontal alignment can cause significant optical loss, leading to low a manufacturing yield of assembled parts. It is difficult to satisfy various constraints relating to strict horizontal alignment tolerances as costs are incurred not only to establish alignment during manufacturing, but also because horizontal and vertical alignment have to be maintained after assembly.

Various attempts in designing couplers have been performed in an attempt to improve misalignment tolerance. However, most of these couplers utilize complex designs that are impractical given modern constraints in fabrication and manufacturing. Additionally, may couplers utilize a fork design that attempts to split coupled light into two or more outputs. Other designs attempt to join multiple waveguides, or "tips," using a Y-branch structure. However, these Y-branch structures are incredibly difficult to fabricate reliably.

TECHNICAL FIELD

The present disclosure relates to the field of semiconductor technology and, more specifically, describes a multi-tip waveguide coupler having three independent waveguides that provide improved alignment in at least the horizontal direction.

BRIEF SUMMARY OF THE INVENTION

Various embodiments for a multi-tip laser coupler with improved alignment guidance are disclosed. A photonic integrated circuit (PIC) may include an input interface, an output interface, and a waveguide array. The waveguide array may include a first waveguide, a second waveguide, and a third waveguide. The first waveguide and the third waveguide are coupled to the input interface and do not extend to the output interface or, in other words, the first waveguide and the third waveguide are not physically connected to the output interface. The second waveguide is coupled to the input interface and the output interface. Further, the second waveguide is positioned parallel to and between the first waveguide and a third waveguide. The second waveguide includes a tapered body such that an output end of the second waveguide coupled to the output interface is wider than an input end of the second waveguide coupled to the input interface. The first waveguide and third waveguide do not include tapered bodies, and have corresponding lengths equal or shorter to a length of the second waveguide. Additionally, the first waveguide and third waveguide are positioned close to the second waveguide (e.g., approximately one micron therebetween); however, the first waveguide and the third waveguide are not integrated with or contact the second waveguide.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
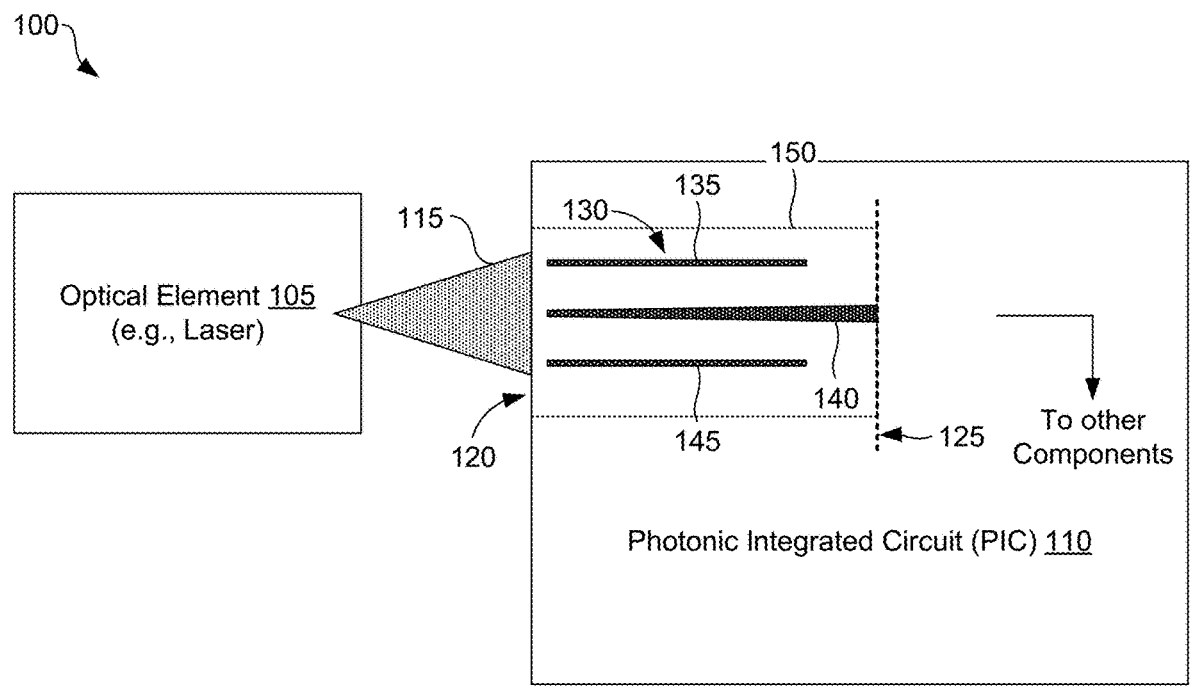
FIG. 1 is a schematic diagram of an optical element emitting an input beam to a photonic integrated circuit having a waveguide array in accordance with various embodiments of the present disclosure.

The present disclosure generally relates to a multi-tip waveguide coupler that provides improved alignment guidance. In order to couple a laser or other optical device to a photonic integrated circuit (PIC), highly-precise mechanical alignment between the laser and waveguides formed in the photonic integrated circuit must be achieved. Currently, vertical alignment tends to be more precise due to existing process controls. However, horizontal alignment has proven to be much more difficult. It is difficult to satisfy various constraints relating to strict horizontal alignment tolerances as costs are incurred not only to establish alignment during manufacturing, but also because horizontal and vertical alignment have to be maintained after assembly. Imperfect horizontal alignment causes significant optical loss, leading to low manufacturing yields. To relax the alignment accuracy constraints with respect to the horizontal direction, tapered waveguides have been employed, where the waveguides are tapered at the edge of the chip and widen as the waveguide approaches an input interface of the circuit or chip. Alternatively, fork-type designs have also been employed.

As such, most solutions for efficiently coupling an optical element, such as a laser, to a photonic integrated circuit utilize a waveguide having a very large cross-section inside the photonic integrated circuit. The large cross-section leads to large chip sizes and increased manufacturing costs. This solution, however, is not feasible in silicon photonics, as a very small waveguide cross-section is needed to enable compact chip size and efficient electro-optic modulation. Other solutions include the use of polymers or three-dimensional printed materials to make spot-size converters. However, these converters are not compatible with existing complementary metal-oxide-semiconductor (CMOS) fabrication processes. Any solutions that are compatible with existing CMOS fabrication processes require a very large area on the photonic integrated circuit (e.g., in a millimeter size scale), which drastically increases chip size and cost.

Accordingly, in various embodiments, a photonic integrated circuit is described. The photonic integrated circuit may include an input interface, an output interface, and a waveguide array, where the waveguide array is compatible with existing photonic integrated circuit manufacturing processes. Further, the waveguide array improves overall coupling efficiency and horizontal alignment tolerance, which leads to better manufacturing yield and more favorable optical performance budgets, as will become apparent.

To this end, in various embodiments, the waveguide array of the photonic integrated circuit may include a first waveguide, a second waveguide, and a third waveguide, where the second waveguide is positioned between, and parallel to, the first waveguide and the third waveguide. As such, the second waveguide may be referred to as a centrally-located or central waveguide. The waveguide array may be integrated with a coupler of the photonic integrated circuit.

The first waveguide and the third waveguide of the waveguide array may be coupled to the input interface of the photonic integration circuit in some embodiments. Notably, the first waveguide and the third waveguide are not coupled to the output interface in various embodiments. The term "not coupled to" can refer to the first waveguide and the third waveguide not extending to or being physically connected to the output interface. However, the second waveguide may be coupled to both the input interface and the output interface. In some embodiments, the second waveguide may include a tapered body such that an output end of the second waveguide coupled to the output interface is wider than an input end of the second waveguide coupled to the input interface.

The waveguide array described herein can relax alignment tolerances required to achieve high optical coupling efficiencies without substantial optical alignment. Notably, the waveguide array relaxes requirements in horizontal alignment accuracies, where horizontal alignment includes a direction parallel to the surface of the primary photonic chip.

In the following discussion, a general description of a multi-tip coupler and its components is provided, followed by a discussion of the operation of the same.

Turning now to FIG. 1, a schematic diagram of an optoelectronic system 100 is shown. The optoelectronic system 100 may include, for example, an optical element 105 and a photonic integrated circuit 110, among other components not separately shown. The optical element 105 may include an optical device, such as a laser or a fiber, that provides an input beam 115 or other optical beam to the photonic integrated circuit 110. In some embodiments, the optical element 105 is one of a photonic chip, or similar type of chip, separate from the photonic integrated circuit 110 or a chip in which the photonic integrated circuit 110 is incorporated. As may be appreciated, the photonic integrated circuit 110 may include an optoelectronic integrated circuit and, as such, may include an input interface 120 and an output interface 125. For instance, single mode optical paths may be routed away from the photonic integrated circuit 110 by way of the output interface 125. In some embodiments, the photonic integrated circuit 110 includes a laser-integrated photonic integrated circuit (LPIC).

Additionally, the photonic integrated circuit 110 may include a waveguide array 130. In various embodiments, the waveguide array 130 may include a first waveguide 135, a second waveguide 140, and a third waveguide 145. As shown in FIG. 1, the second waveguide 140 may be positioned between the first waveguide 135 and the third waveguide 145. Additionally, as shown in FIG. 1, the second waveguide 140 may be positioned near and parallel to the first waveguide 135 and the third waveguide 145, respectively, as will be described.

The first waveguide 135 and the third waveguide 145 may be coupled to the input interface 120 of the photonic integration circuit 110. Notably, the first waveguide 135 and the third waveguide 145 do not reach and are not physically connected to the output interface 125, instead terminating prior to the second waveguide 140. In some embodiments, the waveguide array 130 may be implemented in a coupler 150 embedded inside the photonic integrated circuit 110, where the coupler 150 connects an optical signal, i.e., the input beam 115, received from the optical element 105 to the photonic integrated circuit 110. As may be appreciated, the coupler 150 separates the input beam 115 into the three or more waveguides in the waveguide array 130 on the photonic integrated circuit 110 and, as such, may be referred to as a "multi-tip" coupler 150 in some embodiments. Further, in some embodiments, the multi-tip coupler 150 may be embedded in a single chip carrier package device and, as such, the system may be described as a system-in-a-package (SiP) multi-tip coupler 150.

As the first waveguide 135 and the third waveguide 145 terminate before reaching the output interface 125, the first waveguide 135 and the third waveguide 145 serve to widen a mode of the coupler 150, while not carrying any appreciable optical power. Additionally, the first waveguide 135 and the third waveguide 145, acting in combination with the second waveguide 140 being centrally located and having a tapered body, result in a wider optical mode, which provides a better match to the input beam 115 emitted by the optical element 105, such as a laser. This results in a larger fraction of the input beam 115, such as laser light, being coupled to the photonic integrated circuit 110, and also results in a wider "target'" to which the input beam 115 may be horizontally aligned. Thus, the various embodiments described herein permit a significantly greater tolerance in lateral or horizontal misalignment between the optical element 105 (e.g., a laser) and the photonic integrated circuit 110. This may result in a direct improvement in manufacturing yield.

Figure 2:
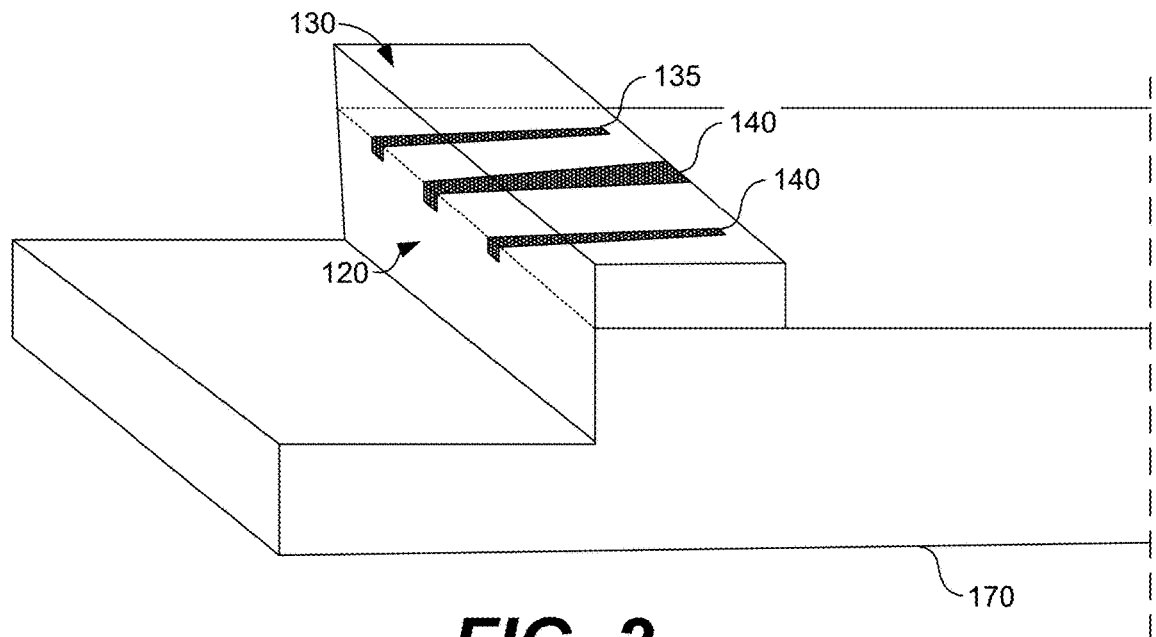
FIG. 2 is a perspective view of a substrate of a photonic integrated circuit having the waveguide array of FIG. 1 in accordance with various embodiments of the present disclosure.
Figure 3:
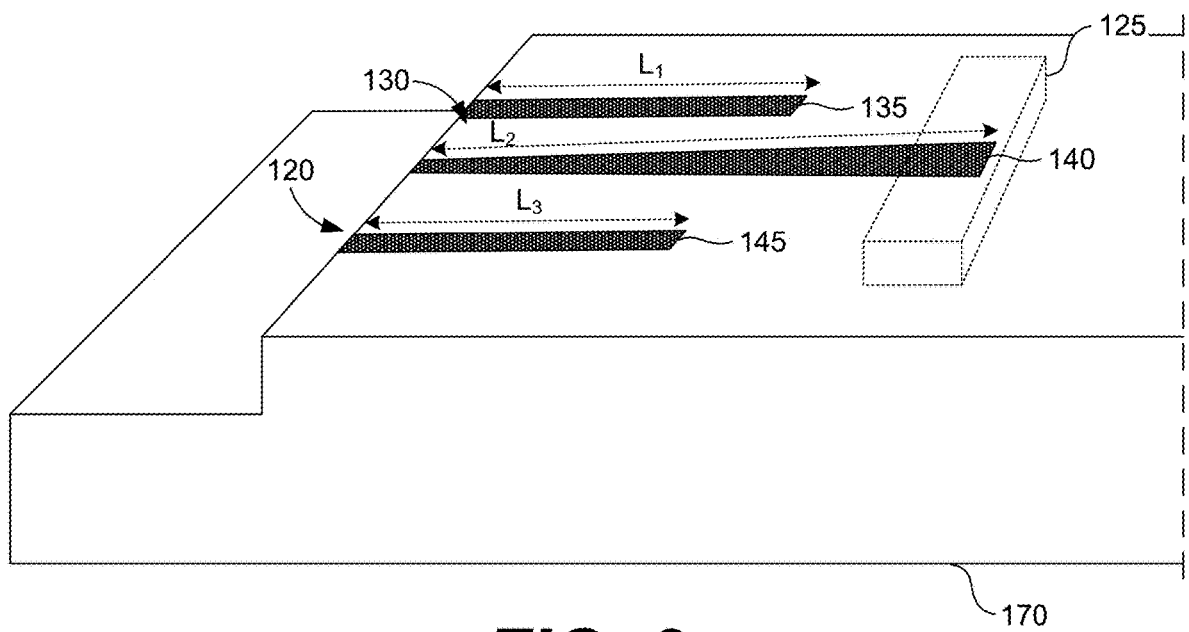
FIG. 3 is another perspective view of a substrate of a photonic integrated circuit having the waveguide array of FIG. 1 in accordance with various embodiments of the present disclosure.

Referring now to FIG. 2 and FIG. 3, various perspective views of a substrate 170 of a photonic integrated circuit 110 having the waveguide array 130 of FIG. 1 are shown in accordance with various embodiments of the present disclosure. It is important to note that the components in FIG. 2 and FIG. 3 are not necessarily to scale and, instead, serve to clearly illustrate the principles of the disclosure. The waveguide array 130 is shown integrated on the substrate 170.

As shown in FIG. 2 and FIG. 3, the first waveguide 135 and the third waveguide 145 do not have a length sufficient to reach or physically touch the output interface 125 and, instead, terminate before the second waveguide 140. For instance, the first waveguide 130 has a first waveguide length $L_1$, the second waveguide has a second waveguide length $L_2$, and the third waveguide has a third waveguide length $L_3$. In some embodiments, the first waveguide length $L_1$ may be equal or substantially similar to the third waveguide length $L_3$. Further, in some embodiments, the second waveguide length $L_2$ is greater than the first waveguide length $L_1$ and/or the third waveguide length $L_3$.

In some embodiments, the second waveguide length $L_2$ is approximately 30-100 μm. Further, the first waveguide length $L_1$ is at least 30 μm and the third waveguide length $L_3$ is at least 30 μm. Optically, if the first waveguide length $L_1$ and the third waveguide length $L_3$ are approximately 30 μm, an increase in the first waveguide length $L_1$ and the third waveguide length $L_3$ does not alter the output mode of the coupler 150.

As shown in FIG. 2 and FIG. 3, the second waveguide 140 may be coupled to both of the input interface 120 and the output interface 125. Further, as shown in FIGS. 2 and 3, the second waveguide 140 may be positioned parallel to and between the first waveguide 135 and a third waveguide 145 such that the second waveguide 140 is centrally located. While the first waveguide 135 and a third waveguide 145 are positioned near the second waveguide 140, the first waveguide 135 and the third waveguide 145 are not integrated and do not come into contact with the second waveguide 140. In other words, the distance between the first waveguide 135 and the second waveguide 140, and the third waveguide 145 and the second waveguide 140, is large enough such that the waveguides are substantially independent and not physically connected to each other.

In some embodiments, a distance between the first waveguide 135 and the second waveguide 140 is approximately one micron and a distance between the second waveguide 140 and the third waveguide 145 is approximately one micron. It is understood, however, that other distances between respective ones of the waveguides in the waveguide array 130 can be employed, such as two microns, three microns, and so forth. In alternative embodiments, a distance between the first waveguide 135 and the second waveguide 140 is between approximately 0.5 μm to approximately 3 μm and, similarly, a distance between the second waveguide 140 and the third waveguide 145 is between approximately 0.5 μm to approximately 3 μm.

In some embodiments, the distance between the first waveguide 135 and the second waveguide 140, and a distance between the second waveguide 140 and the third waveguide 145, may be determined as a function of a desired wavelength. For instance, if a larger wavelength is used, the distance between the respective ones of the waveguides in the waveguide array 130 may be increased. In some examples, the distance between the respective ones of the waveguides in the waveguide array 130 is half the distance between two or three wavelengths.

However, in embodiments in which a wavelength of approximately 1.2 to 1.6 microns is employed, the distance between the first waveguide 135 and the second waveguide 140 is approximately one micron and a distance between the second waveguide 140 and the third waveguide 145 is approximately one micron.

Further, in various embodiments, the second waveguide 140 may include a tapered body such that an output end of the second waveguide 140 coupled to the output interface 125 is wider than an input end of the second waveguide 140 coupled to the input interface 120. For instance, in various embodiments, the second waveguide 140 may include a tapered body that is tapered close to the input interface of the optical element 105. The tapered body can include a progressive widening of the second waveguide 140 as the waveguide body approaches the output interface 125 of the photonic integrated circuit 110.

Notably, in some embodiments and as shown in FIGS. 1-3, none of the first waveguide 135, the second waveguide 140, and the third waveguide 145 include branches or forks that are commonly seen in fork-type structures and inverse taper waveguides.

The waveguide array 130 may be compatible with existing photonic integrated circuit manufacturing processes, as may be appreciated. For instance, the first waveguide 135, the second waveguide 140, and the third waveguide 145 may be etched or otherwise formed in a silicon material. The waveguide array 130 may improve an overall coupling efficiency as well as a horizontal alignment tolerance, thereby providing improved manufacturing yield and more favorable optical performance budgets.

Further, the photonic integrated circuit 110 may be fabricated with a silicon-on-insulator (SOI) material. More specifically, the first waveguide 135, the second waveguide 140, and the third waveguide 145 may be formed in a top silicon layer of a silicon-on-insulator material. For instance, the waveguide array 130 may be formed in a single silicon layer positioned on top of an silicon dioxide layer, where the silicon dioxide layer is positioned above a silicon wafer (or silicon substrate layer). The single silicon layer in which the waveguide array 130 is formed may be referred to as a waveguide layer.

The assembly of the photonic integrated circuit (e.g., on a chip) may be performed to allow vertical alignment of the input beam 115 to the photonic integrated circuit 110. Even further, the use of the silicon-on-insulator material facilitates the use of an input beam 103 coupled to a unique single mode optical path on the photonic integrated circuit 110, or if it is coupled to a multi-mode optical path on the photonic integrated circuit 110.

Figure 4:
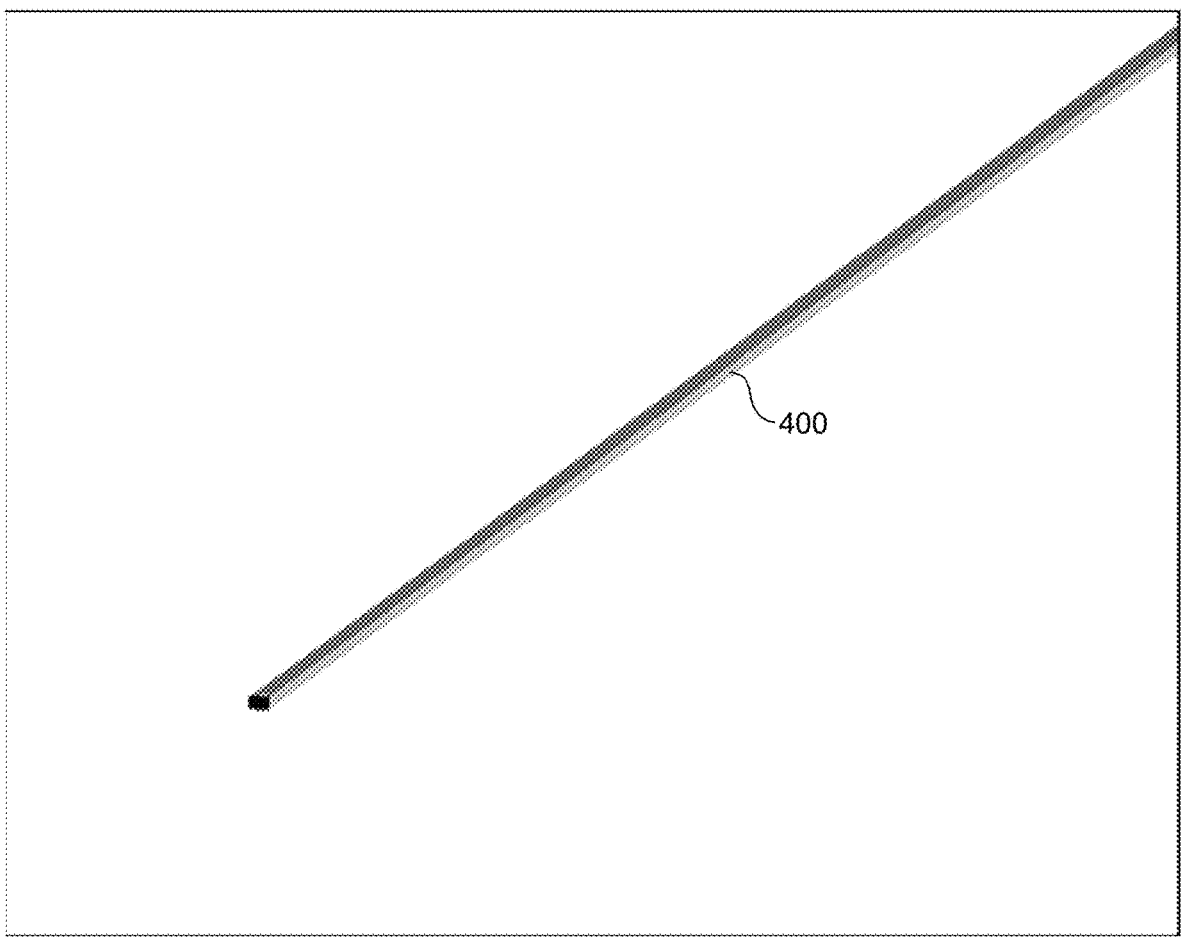
FIG. 4 is a three-dimensional perspective view of a conventional tapered coupler in accordance with various embodiments of the present disclosure.

Moving along to FIG. 4, a three-dimensional perspective view of a conventional waveguide coupler 400 is shown. The conventional waveguide coupler 400 is composed of a single inverse tapered waveguide having a rectangular cross section. As such, only the width of the tip can be adjusted to optimize the structure for matching a mode. Due to this limitation of the single inverse tapered waveguide, coupling efficiency (CE) is greatly limited in many systems.

Figure 5:
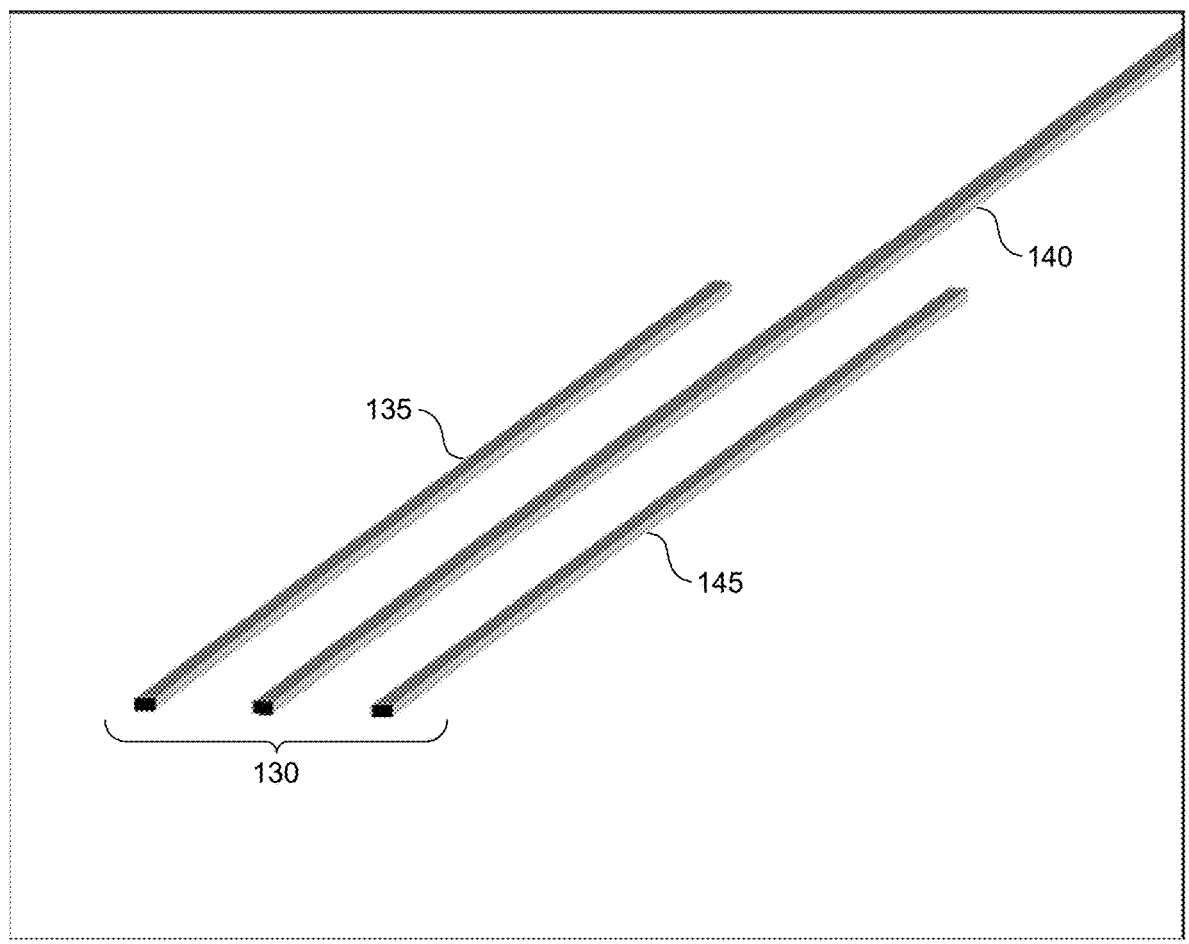
FIG. 5 is a three-dimensional perspective view of the waveguide array of FIG. 1 in accordance with various embodiments of the present disclosure.

Turning now to FIG. 5, a three-dimensional perspective view of the waveguide array 130 of FIGS. 1-3 is shown in accordance with various embodiments of the present disclosure. As shown in the three-dimensional perspective view, the waveguide array 130 includes the first waveguide 135, the second waveguide 140, and the third waveguide 145, where the second waveguide 140 is positioned between, and parallel to, the first waveguide 135 and the third waveguide 145. Additionally, the second waveguide 140 is positioned close to the first waveguide 135 and the third waveguide 145. For instance, a distance between the first waveguide 135 and the second waveguide 140 is approximately one micron, and a distance between the second waveguide 140 and the third waveguide 145 is approximately one micron. However, the distance between the first waveguide 135 and the second waveguide 140, and the third waveguide 145 and the second waveguide 140, is large enough such that the waveguides in the waveguide array 130 are independent and not physically connected to each other.

As shown in FIG. 5, the first waveguide 135 and the third waveguide 145 terminate before the second waveguide 140. In other words, the first waveguide 130 has a first waveguide length $L_1$, the second waveguide has a second waveguide length $L_2$, and the third waveguide has a third waveguide length $L_3$, where the first waveguide length $L_1$ and the third waveguide length $L_3$ are each less than second waveguide length $L_2$.

Figure 6:
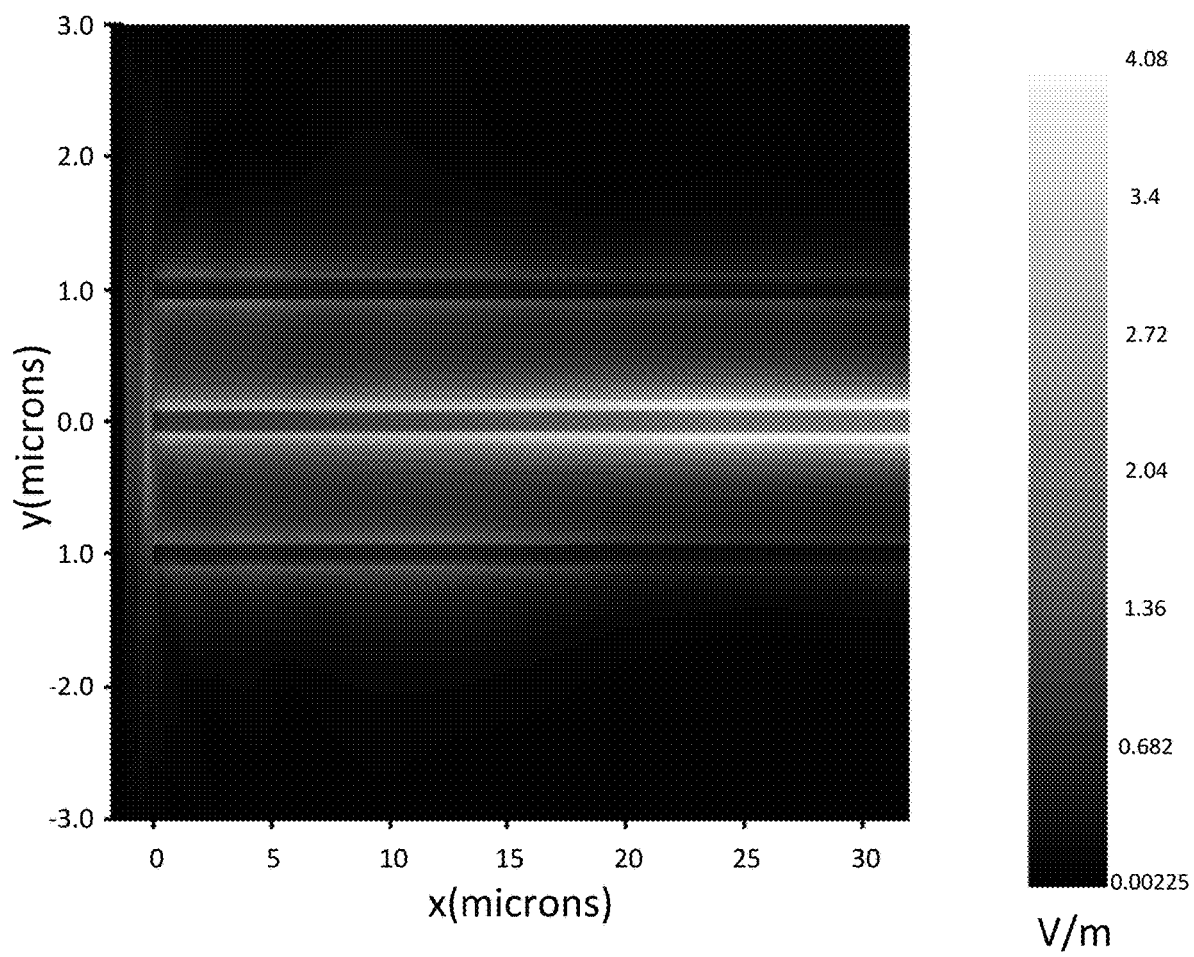
FIG. 6 is an image of the simulated optical field of the waveguide array of FIG. 1 in accordance with various embodiments of the present disclosure.

Moving now to FIG. 6, a simulated electron microscopic image depicting performance of the waveguide array 130 of FIG. 1 is shown in accordance with various embodiments of the present disclosure. As can be seen from FIG. 6, as the first waveguide 135 and the third waveguide 145 terminate before reaching the output interface 125, the first waveguide 135 and the third waveguide 145 do not carry any appreciable optical power. However, the size and position of the first waveguide 135 and the third waveguide 145 serve to widen a mode of the coupler 150. More specifically, the first waveguide 135 and the third waveguide 145, in combination with the second waveguide 140 being centrally located and having a tapered body, provide a wider optical mode. The wider optical mode results in a better alignment with the input beam 115 emitted by the optical element 105, such as a laser. This results in a larger fraction of the input beam 115, such as laser light, being coupled to the photonic integrated circuit 110, and also results in a wider "target" to which the input beam 115 may be horizontally aligned. Thus, the various embodiments described herein permit a significantly greater tolerance in lateral or horizontal misalignment between the optical element 105 (e.g., a laser) and the photonic integrated circuit 110. This may result in a direct improvement in manufacturing yield.

Figure 7:
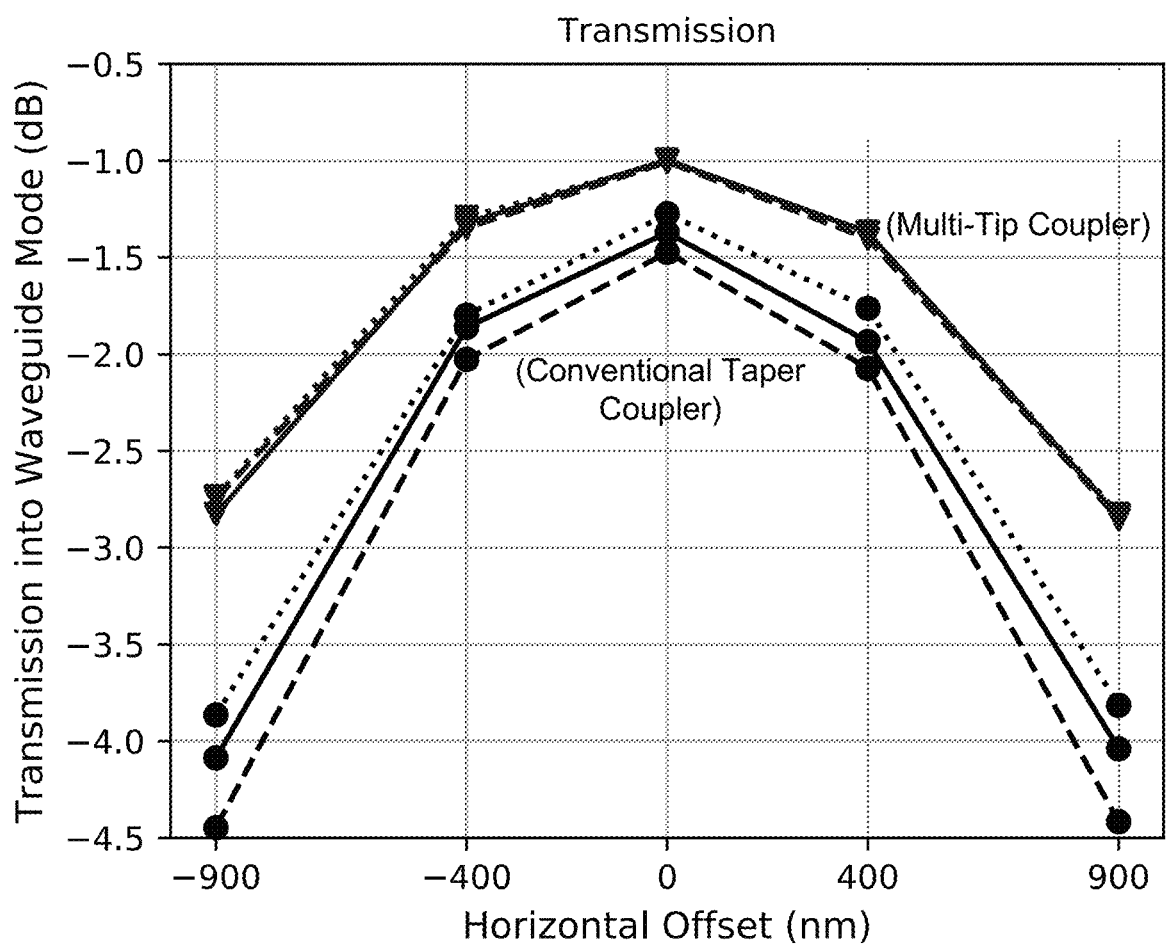
FIG. 7 is a chart depicting simulated performance of the waveguide array of FIG. 1 in accordance with various embodiments of the present disclosure.
Figure 8:
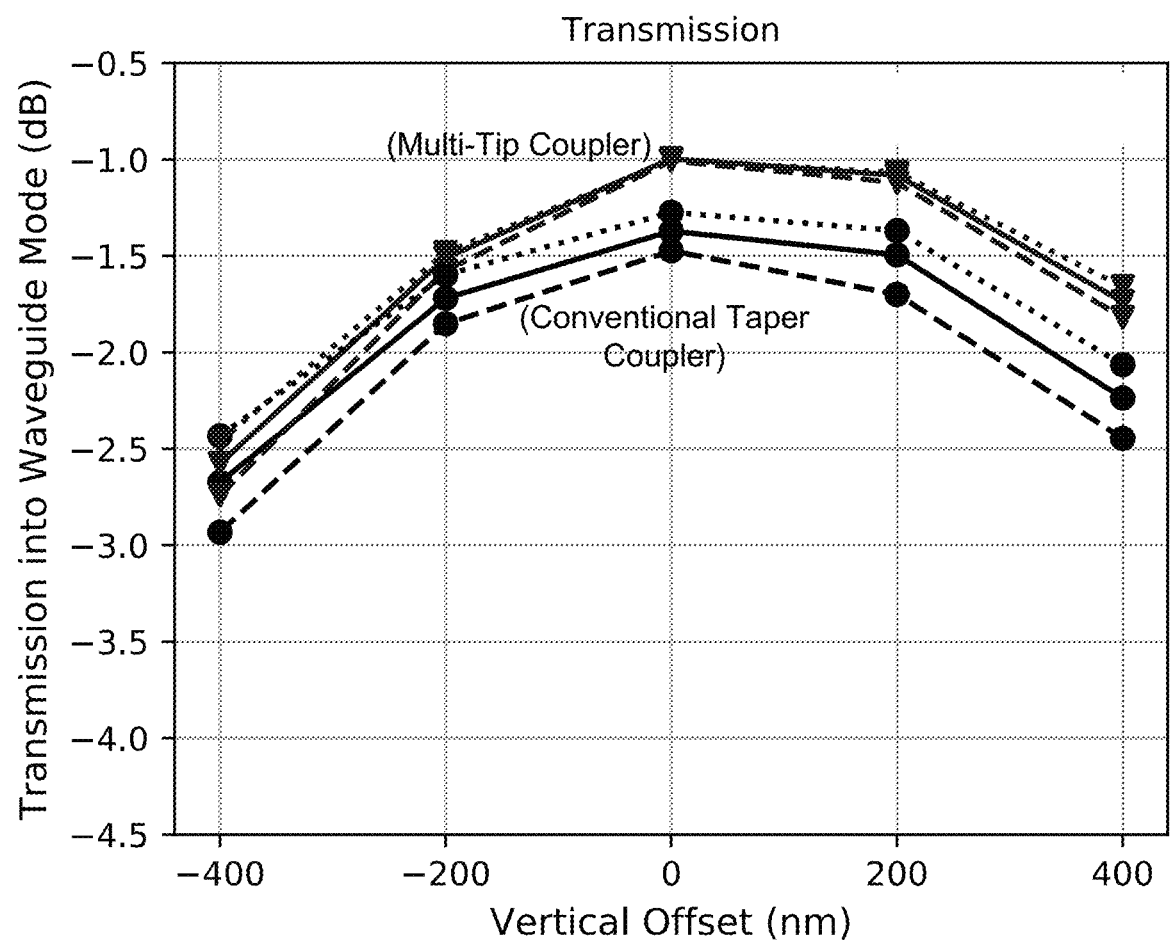
FIG. 8 is another chart depicting simulated performance of the waveguide array of FIG. 1 in accordance with various embodiments of the present disclosure.

Turning now to FIGS. 7 and 8, a first chart 700 and a second chart 800 are shown. The first chart 700 and the second chart 800 plot simulated coupling performance of a conventional taper coupler versus the multi-tip coupler 150 having the waveguide array 130 as described herein. As can be seen from the first chart 700 and the second chart 800, compared to that of a conventional taper coupler, the multi-tip coupler 150 in accordance with the embodiments described herein has a higher overall coupling efficiency, a much higher coupling efficiency under severe horizontal misalignment, much lower wavelength dependence, and the same back reflection and tolerance to vertical misalignment. Each of the different line styles in FIG. 7 and FIG. 8 correspond to different wavelengths, as can be appreciated.

As such, in accordance with various embodiments described herein, a method for providing a waveguide array 130 may include forming a first waveguide 135 in a material, such as a silicon-on-insulator material; forming a second waveguide 140 in the material parallel to and between the first waveguide 135 and a third waveguide 145, the second waveguide 140 comprising a tapered body; and forming the third waveguide 145 in the material, where the first waveguide 135 and the third waveguide 145 as formed each have a length less than that of the second waveguide 140. The method may further include providing a photonic integrated circuit 110 or a chip having the photonic integrated circuit 110 incorporated therewith, where the waveguide array 130 is formed in the photonic integrated circuit 110 such that the photonic integrated circuit 110 includes an input interface 120 and an output interface 125.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, the person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. The terms "first", "second", etc. are used only as labels, rather than a limitation for a number of the objects.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An optoelectronic system, comprising:
  a photonic integrated circuit (PIC) comprising an input interface having an end face, an output interface, and a waveguide array, wherein the waveguide array comprises:
  a first waveguide intersecting the end face of the input interface and not extending to the output interface, the first waveguide having a termination end spaced apart from the input interface;
  a third waveguide; and
  a second waveguide intersecting the end face of the input interface and the output interface, the second waveguide being positioned parallel to and between the first waveguide and the third waveguide, the second waveguide comprising a continuously tapered body such that an output end of the second waveguide coupled to the output interface is wider than an input end of the second waveguide coupled to the input interface, wherein the continuously tapered body of the second waveguide intersects the output interface;
  the third waveguide intersecting the end face of the input interface and not extending to the output interface, and the continuously tapered body of the second waveguide extending between the termination end of the first waveguide and the output interface.

2. The optoelectronic system of claim 1, wherein:
  the first waveguide has a first waveguide length;
  the second waveguide has a second waveguide length;
  the third waveguide has a third waveguide length;

the first waveguide length is substantially similar to the third waveguide length; and the second waveguide length is greater than the first waveguide length and the third waveguide length.

3. The optoelectronic system of claim 1, further comprising an optical element coupled to the photonic integrated circuit, the optical element being configured to provide an input beam at the end face of the input interface.

4. The optoelectronic system of claim 1, wherein the first waveguide, the second waveguide, and the third waveguide are formed in a silicon-on-insulator (SOI) material.

5. The optoelectronic system of claim 1, wherein the first waveguide and the third waveguide have uniform, non-tapered bodies.

6. A waveguide array, comprising:
a photonic integrated circuit (PIC) comprising a plurality of waveguides, all of the plurality of waveguides being positioned in a first layer of the photonic integrated circuit (PIC),
the plurality of waveguides comprising:
a first waveguide;
a third waveguide; and
a second waveguide positioned between the first waveguide and the third waveguide, the second waveguide comprising a continuously tapered body having an output end and an input end, the output end being wider than the input end; and
wherein the first waveguide and the third waveguide each have a length less than that of the second waveguide, wherein a first end of each of the first waveguide, the second waveguide, and the third waveguide are aligned, and wherein the continuously tapered body of the second waveguide extends between a termination end of the first waveguide opposite the first end of the first waveguide and the output interface, wherein the continuously tapered body of the second waveguide intersects the output interface.

7. The waveguide array of claim 6, wherein the photonic integrated circuit (PIC) includes an input interface and an output interface.

8. The waveguide array of claim 7, wherein:
the first waveguide is coupled to the input interface and does not extend to the output interface; and
the third waveguide is coupled to the input interface and does not extend to the output interface.

9. The waveguide array of claim 6, wherein the photonic integrated circuit is coupled to an optical element, the optical element being configured to provide an input beam at the input interface.

10. The waveguide array of claim 6, wherein the waveguide array comprises only the first waveguide, the second waveguide, and the third waveguide.

11. The waveguide array of claim 6, wherein:
the first waveguide has a first waveguide length;
the second waveguide has a second waveguide length;
the third waveguide has a third waveguide length;
the first waveguide length is substantially similar to the third waveguide length; and
the second waveguide length is greater than the first waveguide length and the third waveguide length.

12. The waveguide array of claim 6, wherein the first waveguide is positioned parallel to the second waveguide, and the second waveguide is positioned parallel to third waveguide.

13. The waveguide array of claim 6, wherein the first waveguide, the second waveguide, and the third waveguide are formed in a silicon-on-insulator (SOI) material.

14. The waveguide array of claim 6, wherein the first waveguide and the third waveguide have uniform, non-tapered bodies.

15. A method of providing a waveguide array, comprising:
forming a first waveguide in a first layer of a material;
forming a second waveguide in the first layer of the material, the second waveguide comprising a continuously tapered body that is wider at an output end than at an input end; and
forming a third waveguide in the first layer of the material, wherein the first waveguide and the third waveguide as formed each have a length less than that of the second waveguide, the second waveguide being parallel to and between the first waveguide and the third waveguide, each of the first waveguide, the second waveguide, and the third waveguide intersecting an end face of an input interface, and the continuously tapered body of the second waveguide extending between a termination end of the first waveguide spaced apart from the end face of the input interface and the output interface, wherein the continuously tapered body of the second waveguide intersects the output interface.

16. The method of claim 15, further comprising providing a photonic integrated circuit (PIC), wherein the waveguide array is formed in the photonic integrated circuit, the photonic integrated circuit comprising an input interface and an output interface.

17. The method of claim 16, wherein:
the first waveguide is coupled to the input interface and does not extend to the output interface; and
the third waveguide is coupled to the input interface and does not extend to the output interface.

18. The method of claim 15, wherein:
the photonic integrated circuit is coupled to an optical element, the optical element being configured to provide an input beam at the input interface;
the waveguide array comprises only the first waveguide, the second waveguide, and the third waveguide; and
an output end of the second waveguide is wider than an input end of the second waveguide.

19. The method of claim 15, wherein:
the first waveguide has a first waveguide length;
the second waveguide has a second waveguide length;
the third waveguide has a third waveguide length;
the first waveguide length is substantially similar to the third waveguide length; and
the second waveguide length is greater than the first waveguide length and the third waveguide length.

20. The optoelectronic system of claim 1, wherein a first end of the first waveguide at the input interface, a first end of the second waveguide at the input interface, and a first end of the third waveguide at the input interface are horizontally aligned.

21. The optoelectronic system of claim 20, wherein the first end of the first waveguide at the input interface, the first end of the second waveguide at the input interface,
and the first end of the third waveguide at the input interface each have a rectangular cross section.

22. The optoelectronic system of claim 21, wherein a thickness of each of the first end of the first waveguide at the input interface, the first end of the second waveguide at the input interface, and the first end of the third waveguide at the input interface are equal.

23. The optoelectronic system of claim 1, further comprising an optical element having a face spaced apart from the input interface of the photonic integrated circuit (PIC), the optical element positioned to produce an input beam which illuminates the input interface of the photonic integrated circuit (PIC) across a free space between the face of the optical element and the input interface of the photonic integrated circuit (PIC).

24. The optoelectronic system of claim 23, wherein a first end of the first waveguide at the input interface, a first end of the second waveguide at the input interface, and a first end of the third waveguide at the input interface are horizontally aligned.

25. The optoelectronic system of claim 24, wherein the first end of the first waveguide at the input interface, the first end of the second waveguide at the input interface,
   and the first end of the third waveguide at the input interface each have a rectangular cross section.

26. The optoelectronic system of claim 25, wherein a thickness of each of the first end of the first waveguide at the input interface, the first end of the second waveguide at the input interface, and the first end of the third waveguide at the input interface are equal.

27. The optoelectronic system of claim 23, wherein the optical element is a laser.

28. The optoelectronic system of claim 27, wherein a first end of the first waveguide at the input interface, a first end of the second waveguide at the input interface, and a first end of the third waveguide at the input interface are horizontally aligned producing a target having a horizontal extent longer than a vertical extent to which the input beam is horizontally aligned.

* * * * *